(12) United States Patent
Helbling et al.

(10) Patent No.: US 8,824,642 B2
(45) Date of Patent: Sep. 2, 2014

(54) METHOD AND APPARATUS FOR ENABLING A USER TO PERFORM TELECOMMUNICATIONS OPERATIONS

(75) Inventors: Christopher L. Helbling, Norwalk, CT (US); Craig L. Reding, Midland Park, NJ (US); Paula Dromlewicz, Holden, MA (US); John Reformato, Tarrytown, NY (US)

(73) Assignees: Verizon Services Corp., Ashburn, VA (US); Verizon Data Services LLC, Temple Terrace, FL (US)

( * ) Notice: Subject to any disclaimer, the term of this patent is extended or adjusted under 35 U.S.C. 154(b) by 1655 days.

(21) Appl. No.: 11/647,227

(22) Filed: Dec. 29, 2006

(65) Prior Publication Data

US 2008/0162708 A1 Jul. 3, 2008

(51) Int. Cl.
| | |
|---|---|
| H04M 1/64 | (2006.01) |
| H04M 3/38 | (2006.01) |
| H04M 3/493 | (2006.01) |
| H04B 1/38 | (2006.01) |
| H04M 3/533 | (2006.01) |

(52) U.S. Cl.
CPC ............... *H04M 3/38* (2013.01); *H04M 3/493* (2013.01); *H04M 2201/41* (2013.01); *H04M 3/533* (2013.01); *H04M 2201/40* (2013.01)
USPC ....................................... 379/88.02; 455/563

(58) Field of Classification Search
USPC ............ 379/68, 88.14, 88.16, 88.17, 211.02, 379/218.01; 709/246
See application file for complete search history.

(56) References Cited

U.S. PATENT DOCUMENTS

| | | | | |
|---|---|---|---|---|
| 5,475,740 | A * | 12/1995 | Biggs et al. | 379/91.02 |
| 6,327,363 | B1 * | 12/2001 | Henderson et al. | 379/265.01 |
| 2001/0054085 | A1 * | 12/2001 | Kurganov | 709/218 |
| 2003/0043985 | A1 * | 3/2003 | Wu | 379/144.05 |
| 2009/0286507 | A1 * | 11/2009 | O'Neil et al. | 455/406 |
| 2010/0232580 | A1 * | 9/2010 | Kurganov | 379/88.01 |
| 2011/0158228 | A1 * | 6/2011 | Dowling et al. | 370/352 |

* cited by examiner

*Primary Examiner* — Fan Tsang
*Assistant Examiner* — Solomon Bezuayehu (57) ABSTRACT

Methods and apparatuses for enabling a user to perform telecommunication operations are disclosed. A method disclosed includes receiving a device having a storage containing data corresponding to an account identifier and data associated with a voice portal and then establishing a connection with a server associated with the voice portal. Upon establishing the connection, the data corresponding to the account identifier is provided to the server associated with the voice portal. Then, upon confirmation by the server that the account identifier corresponds to an active subscriber account, the user is enabled to perform selected operations of the voice portal using voice input commands based on limitations, if any, associated with the active subscriber account.

21 Claims, 7 Drawing Sheets

METHOD AND APPARATUS FOR ENABLING A USER TO PERFORM TELECOMMUNICATIONS OPERATIONS

BACKGROUND INFORMATION

A user may use a payphone or a video-equipped communication kiosk to access a voice portal. A voice portal allows a user to have telephone-based voice access to web portals for information such as weather, sports, or stock quotes. In addition, a voice portal may enable the user to perform telecommunication operations such as accessing caller ID and voice mail, routing incoming calls to voice mail or another number in real time, scheduling call forwarding in advance, sending email and text messages, and/or viewing and updating an address book or calendar.

Many current payphones or video-equipped communication kiosks are equipped with card readers. To access a voice portal through such a payphone, a user must swipe his credit card or calling card, wait for a card validation system to validate the card, dial the voice portal number, and enter a phone number and PIN before being able to use the voice portal.

This conventional method of accessing a voice portal through a payphone, however, is cumbersome. An easier method of connecting a voice portal and authenticating the user would be desirable. For example, an easier method would allow the user to swipe credit card or calling card, and automatically connect to the voice portal after pre-authenticating the user.

DETAILED DESCRIPTION OF PREFERRED EMBODIMENTS

Reference will now be made in detail to exemplary embodiments consistent with the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention (as defined by the appended claims). It is to be understood that other implementations may be utilized and that structural and method changes may be made without departing from the scope of present invention (as defined by the appended claims).

Consistent with the present invention, methods and apparatuses may enable a user to perform telecommunication operations by automatically connecting a voice portal and authenticating the user upon receiving, for example, a credit card or calling card. The user may then perform selected operations of the voice portal using voice input commands based on limitations, if any, associated with an active subscriber account.

Figure 1:
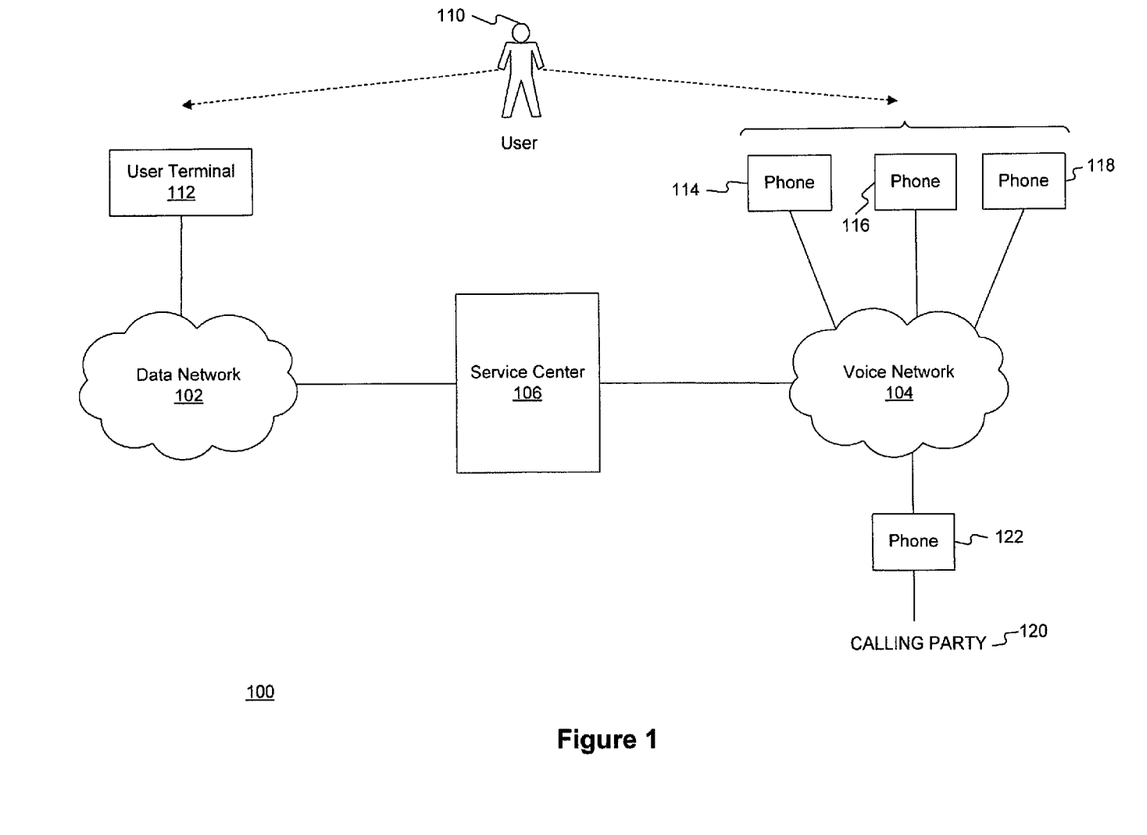
FIG. 1 is a diagram of an exemplary data processing and telecommunications environment.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, firmware, and/or any combination of these structures. Environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118. It is to be understood that phone 122 may take many forms, such as a cell phone, a payphone, or a video-equipped communication kiosk.

Data network 102 provides communications between the various entities depicted in environment 100 of FIG. 1, such as user terminal 112 and service center 106. Data network 102 may be a shared, public, or private network and may encompass a wide area or local area. Data network 102 may be implemented through any suitable combination of wired and/or wireless communication networks. Although FIG. 1 shows a single data network 102, those skilled in the art will appreciate that network 102 is only representative in nature and in some implementations may consist of more than one network configuration designed to communicate using various wireless and wireline structures and various protocols. By way of example, data network 102 may be implemented through a wide area network ("WAN"), local area network ("LAN"), an intranet, and/or the Internet. Further, service center 106 may be connected to multiple data networks 102, such as, for example, a wireless carrier network and the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using Voice-over Internet Protocol ("VoIP") technology. In addition, voice network 104 may be implemented using both PSTN and VoIP technology. Further, service center 106 may be connected to multiple voice networks 104, such as, for example, Verizon's™ voice network, voice networks operated by other carriers, and wireless carrier networks. Although FIG. 1 shows a single voice network 104, those skilled in the art will appreciate that network 104 is only representative in nature and in some implementations may consist of more than one network configuration designed to communicate using various wireless and wireline structures and various protocols.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, firmware, and any combination of these structures. For example, service center 106 may be implemented using one or more general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 with an interface to data network 102. For example, user terminal 112 may be implemented using any device capable of accessing the Internet, such as a general purpose computer or personal computer equipped with a modem. User terminal 112 may also be implemented in other devices, such as the Blackberry device from Research In Motion and Treo device from Palm. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use various protocols in transmitting and receiving messages, including, for example, the Transmission Control Protocol/Internet Protocol (TCP/IP), the hypertext transfer protocol ("HTTP"), the file transfer protocol ("FTP"); the hypertext markup language ("HTML"); and the extensible markup language ("XML"). Furthermore, a client application may be installed on user terminal 112 to communicate directly with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
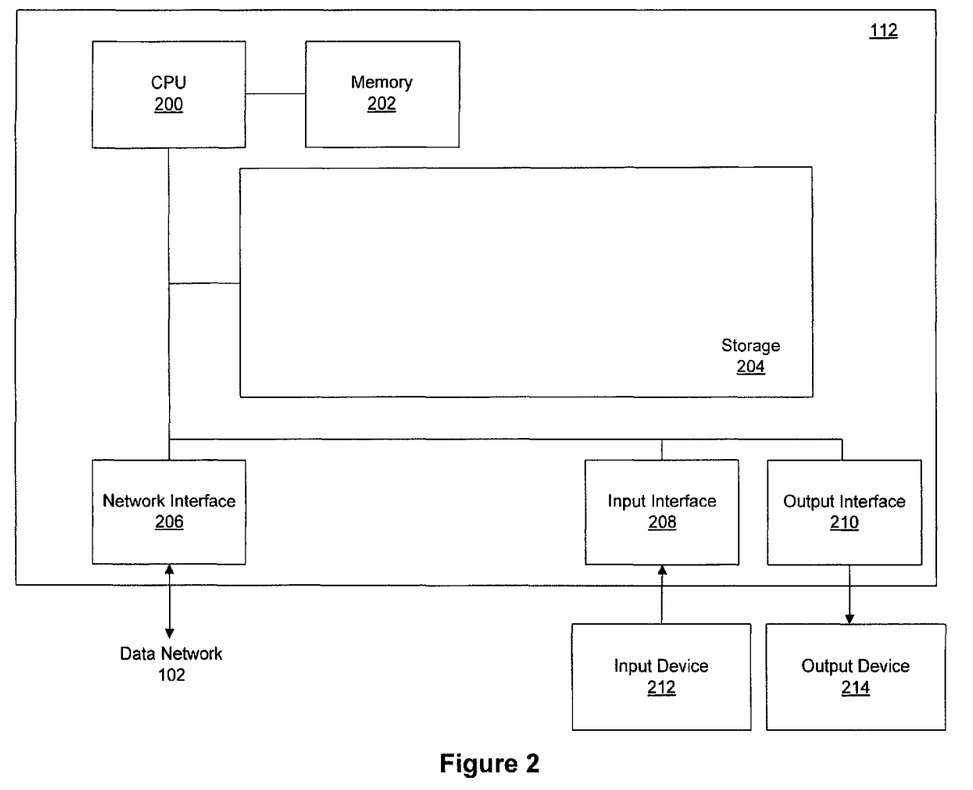
FIG. 2 is a diagram of an exemplary user terminal used in the environment of FIG. 1.

FIG. 2 is a block diagram of an exemplary user terminal 112. User terminal 112 includes a central processing unit ("CPU") 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a coprocessor, memory, registers, and other processing devices and systems as appropriate. CPU 200 may be implemented, for example, using a Pentium™ processor provided by Intel Corporation.

Memory 202 provides a memory for program code for CPU 200. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, flash RAM, a hard drive, an optical drive, a CD ROM drive, a DVD drive, a general-purpose storage device, a removable storage device, and/or other devices capable of storing information. Further, although storage module 204 is shown within user terminal 112, storage module 204 may be external to user terminal 112 yet connected to user terminal 112 using a variety of wired and wireless architectures such as USB, SCSI, etc.

Storage module 204 may include program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service ("MSNMS") client or America Online Instant Messenger ("AIM") client; and an Operating System ("OS"), such as the Windows Operation System provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer provided by Microsoft Corporation or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem or a LAN port.

Input interface 208 receives input from user 110 via input device 212 and provides the input to CPU 200. Input device 212 may include, for example, a keyboard, a microphone, and/or a mouse. Other types of input devices may also be implemented. Input interface 208 thus constitutes a point at which a user interacts with user terminal 112.

Output interface 210 provides information to user 110 via output device 214. Output device 214 may include, for example, a display, a printer, and/or a speaker. Other types of output devices may also be implemented. Output interface 210 similarly constitutes a point at which a user interacts with user terminal 112.

Figure 3:
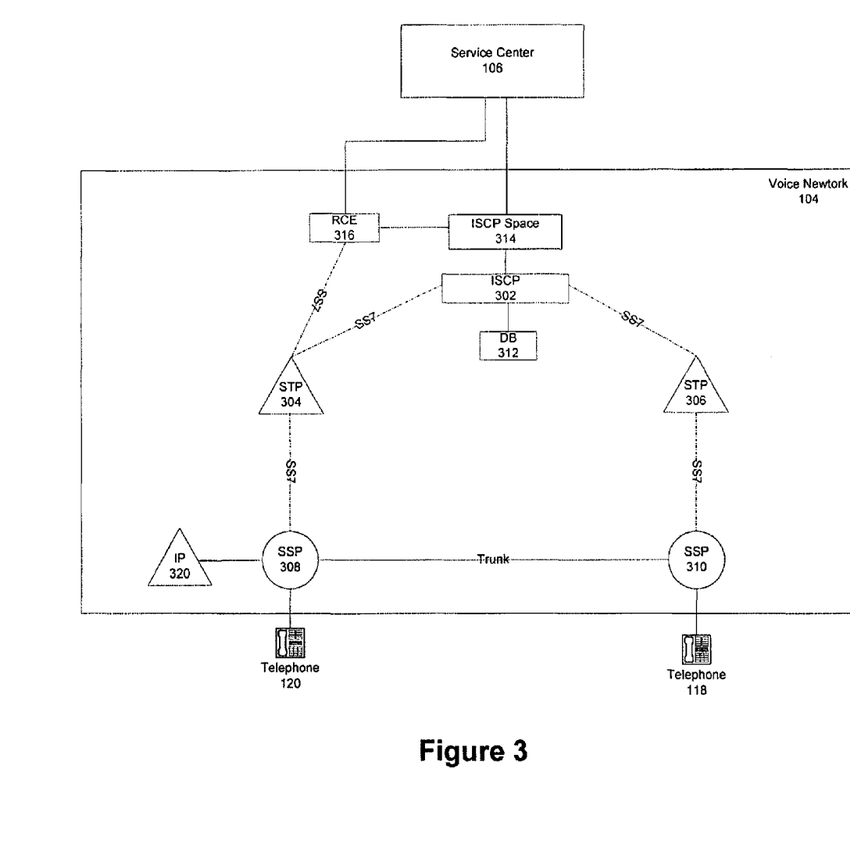
FIG. 3 is a diagram of an exemplary voice network used in the environment of FIG. 1.

FIG. 3 is a diagram of an exemplary voice network 104. As shown, voice network 104 includes an intelligent service control point ("ISCP") 302, service transfer points ("STP") 304 and 306, service switching points ("SSP") 308 and 310, a line information database ("LIDB") 312, an ISCP Service Provisioning and Creation Environment ("SPACE") 314, a Recent Change Engine ("RCE") 316, and an Intelligent Peripheral ("IP") 320.

Voice network 104 may be implemented using the PSTN and SS7 as a signaling protocol. The SS7 protocol allows voice network 104 to provide features, such as call forwarding, caller ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STPs 304 and 306 may route SS7 messages between SSPs 308 and 310. STPs 304 and 306 may be implemented using known hardware and software from manufacturers such as NORTEL™ and LUCENT Technologies™.

SSPs 308 and 310 provide an interface between voice network 104 and phone 114 and phone 122, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 (at phone 122) and user 110 (at phone 114). For example, SSPs 308 and 310 may exchange SS7 messages, such as TCAP messages, within message signal units ("MSU") to control calls, perform database queries to LIDB 312, and provide maintenance information.

LIDB 312 comprises one or more known databases to support the features of voice network 104. For example, LIDB 312 may include subscriber information, such as a service profile, name and address, and credit card validation information.

ISCP SPACE 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more RCEs 316 such as, for example, an Enterprise Recent Change engine (eRC); an Assignment, Activation, and Inventory System ("AAIS"); or a multi-services platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to ISCPs 302.

Additionally, voice network 104 may include one or more IPs. For example, in FIG. 3, an IP 320 is illustrated as being connected to SSP 308. These IPs may be used for providing services, such as voice mail services.

Figure 4:
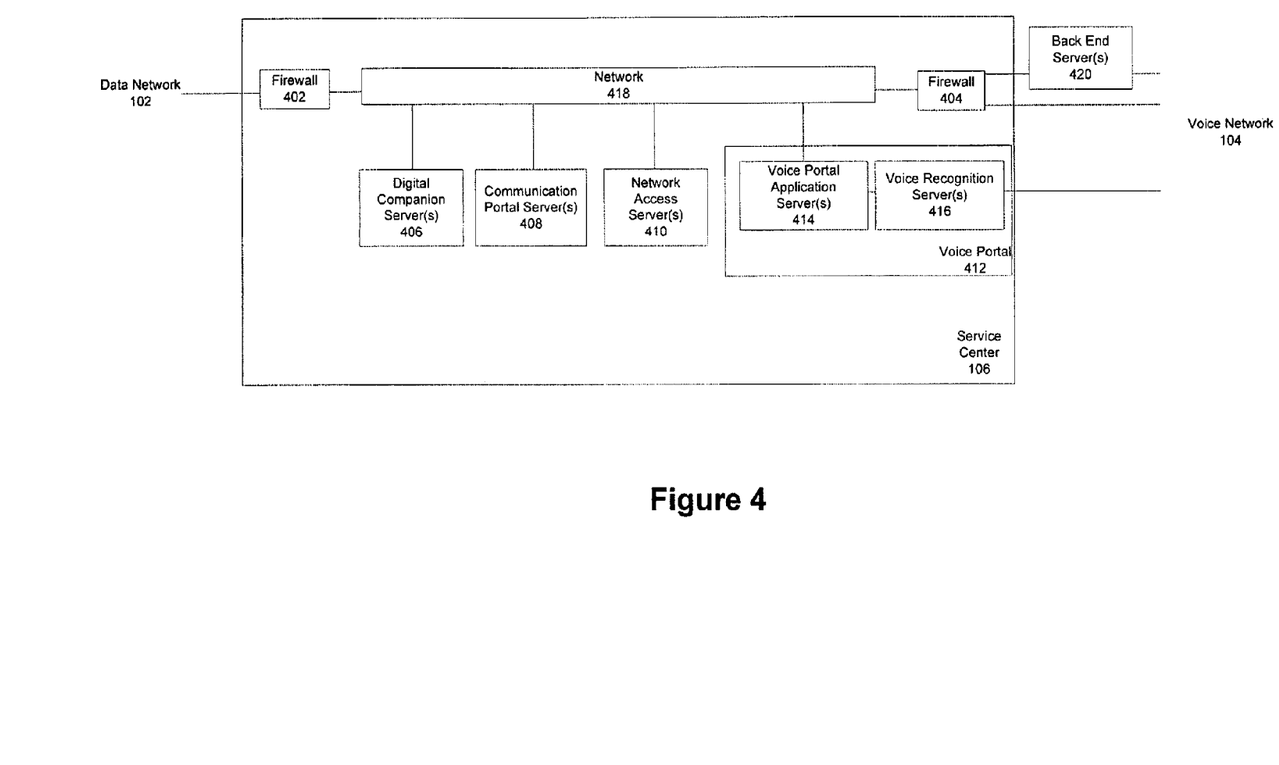
FIG. 4 is a block diagram of an exemplary service center used in the environment of FIG. 1.

FIG. 4 is a block diagram of an exemplary service center 106. As shown, service center 106 may include firewalls 402 and 404, one or more digital companion servers 406, one or more communication portal servers 408, one or more network access servers 410, and a voice portal 412. Voice portal 412 may include a voice portal application server(s) 414 and a voice recognition server(s) 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or Fiber Distributed Data Interface ("FDDI") network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, and 420) may be any type of computer, such as a Unix or DOS-based computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference sessions on-line, etc. Methods and systems of preferred embodiments may leverage digital companion server 406 to perform contact management services.

Communications portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, voice recognition server(s) 416 and voice portal application server(s) 414. Voice recognition server(s) 416 may receive and interpret dictation, or recognize spoken commands. Application server(s) 414 may take, for example, the output from voice recognition server(s) 416, convert it to a format suitable for service center 106, and forward the information to one or more servers (406, 408, and 410) in service center 106.

Figure 5:
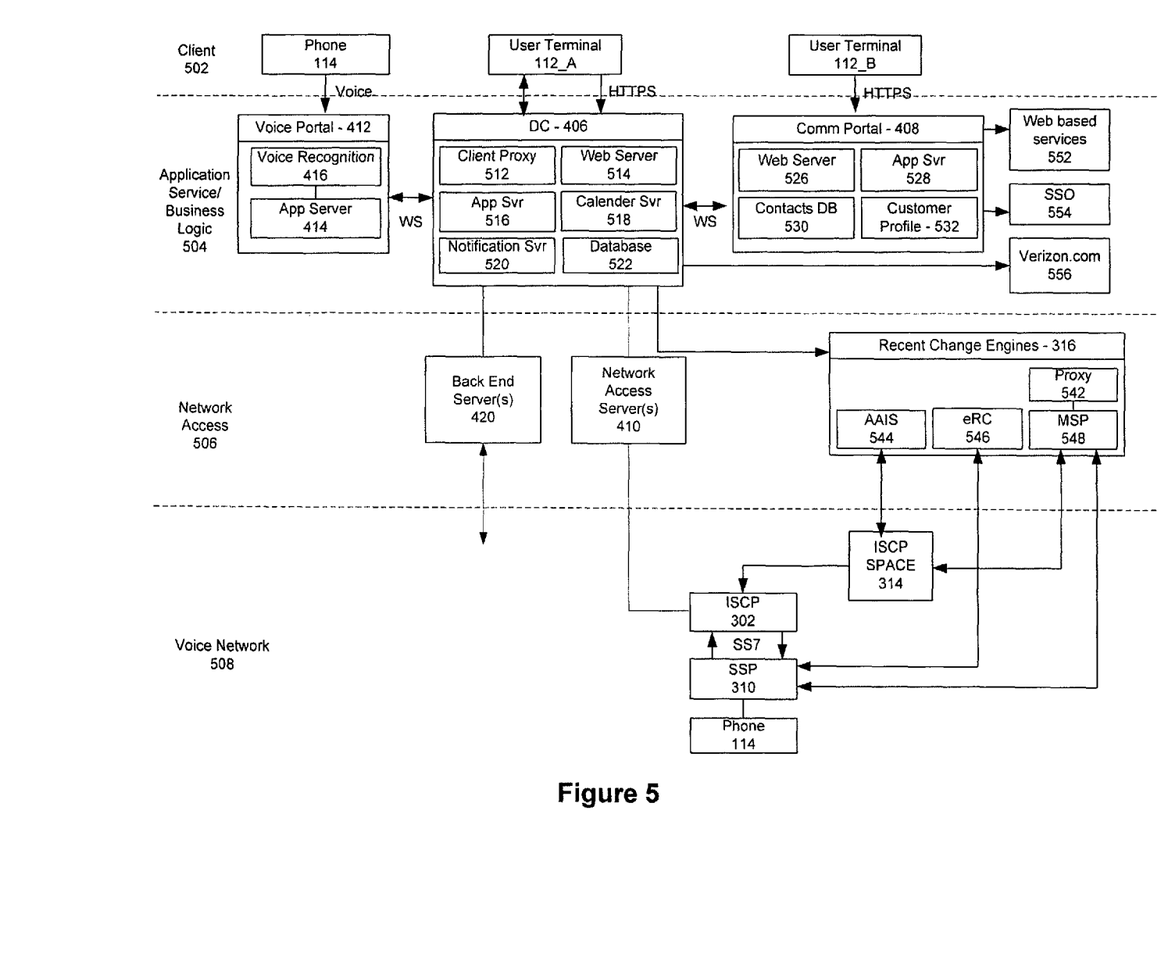
FIG. 5 illustrates a logical architecture of an exemplary data processing and telecommunications system.

FIG. 5 illustrates a logical architecture of an exemplary system, consistent with the present invention. As illustrated, the logical architecture may be split into four planes: client side plane 502, application service business logic plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114 (or 122). As discussed above, user terminals 112 may be any type of device a user may use for communicating with service center 106. For example, user terminal 112_A may be a PDA running a program for communicating with service center 106, while user terminal 112_B may be a desktop-type computer running a web browser for communicating with service center 106 via the Internet. Additionally, the user may have one or more phones 114, such as, for example, one or more standard landline telephones and/or wireless phones.

Application service business logic plane 504 includes digital companion server(s) 406, communication portal server(s) 408, and voice portal 412. These entities may communicate between one another using, for example, web services or any other suitable protocols. Web services are a standardized way of integrating web-based applications using the XML, Simple Object Access Protocol ("SOAP"), Web Services Description Language ("WSDL") and Universal Description, Discovery and Integration ("UDDI") open standards over an Internet Protocol backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls on-line. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties' number, setting up conference sessions on-line, etc. Application server function 516 may facilitate one or more contact management functions.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information usable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as, for example, CD-ROMs, DVDs, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the "superpages.com" website. Application server function 528 could then contact these external services 552 to retrieve information, such as an address for a person in the user's address book.

In another example, application server function 528 of communication portal 408 may interface a single sign-on ("SSO") server 554. SSO 554 may be used to allow users to access all services to which the user subscribes, on the basis of a single authentication that is performed when they initially access the network.

Contacts database 530 may include storage devices for storing an address book for the user. This address book may be any type of address book. For example, the user's address book may include the names, phone numbers, and addresses of people and/or organizations. Contacts database 530 may also include group addresses identifying members of a particular group (e.g., "Friends"). The storage devices in contacts database 530 may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for the voice network. For example, this information may include the user's name, billing address, and other account information. Additionally, the customer profile may include information regarding voice services to which the user subscribes, such as, for example, call waiting, voice mail, etc.

Additionally, application services business logic plane 504 of the architecture may include voice portal 412. As discussed above, voice portal 412 may include, for example, voice recognition server(s) 416 and application server(s) 414, and may be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server(s) 414 of voice portal 412 may include hardware and/or software for exchanging information between digital companion servers 406 and voice recognition server(s) 416 or between communication portal servers 408 and voice recognition server(s) 416. Additionally, application server(s) 414 may be included on a separate server, included in the hardware and software providing voice recognition server(s) 416, included in digital companion servers 406, etc.

Network access plane 506 of the architecture includes the functions for providing connectivity between application service business logic plane 502 and voice network 104. For example, this plane may include network access servers 410 and/or back end servers 420.

Network access servers 410 may be included in the service center 106 and may provide the hardware and software for sending and receiving information to voice network 104 in processing the applications provided by the service center.

For example, network access servers 410 may include a caller ID ("CID") functionality for retrieving caller ID information from voice network 104, a click to dial ("CTD") functionality for instructing an IP in the voice network to place a call via an SSP, and/or a real-time call management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway ("RDA Gateway") of voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless Internet gateway that is used for interfacing with a mobile switching center ("MSC") of a wireless voice network. As with the above-described back end server(s) 420, this wireless Internet gateway may be used for converting requests and information between the formats used by service center 106 and those used by the wireless voice network.

In yet another example, back end server(s) 420 may include a conference bridging server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward through the conference.

In yet another example, back end server(s) 420 may include a Single Number Short Message Service ("SN SMS") server for interfacing the service center 106 with a SMS gateway in voice network 104. This may be used, for example, to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP 302, IPs 320, and SSP 308. Additionally, voice network plane 508 may also include the hardware and software included in a wireless carrier's network, such as, for example, the mobile switching center, etc.

Figure 6:
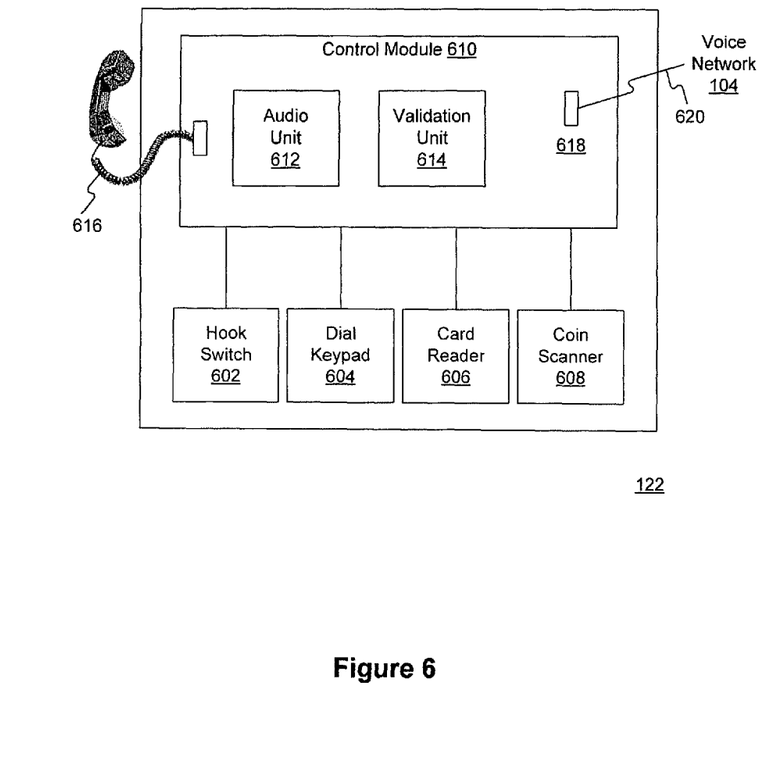
FIG. 6 is a diagram of an exemplary payphone used in the environment of FIG. 1.

FIG. 6 is a block diagram of an exemplary public access phone 122 used in environment 100. Public access phone 122 may include a hook switch 602, a dial keypad 604, a card reader 606, a coin scanner 608, a control module 610, and a handset 616, as is typically provided in existing public "payphones". Control module 610 includes, for example, an audio unit 612 and a validation unit 614. It is to be understood, however, that audio unit 612 and validation unit 614 may be implemented in different ways, and may reside outside control module 610. As shown in FIG. 2, control module 610 is connected with hook switch 602, dial keypad 604, card reader 606 and coin scanner 608. In addition, control module 610 has a line receptacle 618 for connecting an external telephone or cable line 620, which may connect phone 122 to voice network 104 and/or data network 102.

Card reader 606 may include facilities that are capable of reading a device, such as a card storing information (e.g., a credit card, calling card), or an electronic pass storing information (e.g., a "smart card" or an RFID-enabled device), each of which may have a storage that may contain an account identifier and/or identifying data associated with voice portal 412 (shown in FIG. 4). For example, card reader 606 retrieves the credit card account number after a user, such as calling party 120, swipes/passes a credit card using the card reader. This credit card number may be associated with a voice portal subscriber account having an account identifier. In another example, card reader 606 may retrieve data from an electronic pass device that includes a voice portal identifier for voice portal 412 (e.g., a telephone number, code or address) and an account identifier associated with a voice portal subscriber account. Other examples are possible.

It is to be understood that card reader 606 may be configured to communicate with the device in various methods. In one example, card reader 606 may include a facility that is configured to read a magnetic strip used for storage in a credit card or a calling card. In another example, card reader 606 may include a facility that is configured to communicate with a storage in an electronic pass electronically, without swiping a card by calling party 120. In yet another example, card reader 606 may include a facility that is configured to read a storage of a device through wireless communication. Information may be communicated in an encrypted or unencrypted form, as may be desired by the implementation and is well known.

After successfully reading the device, card reader 606 will then provide the received information—for example, identification data associated with a voice portal and/or an account identifier—to control module 610. Control module 610 may then determine that a request is being made to connect to the voice portal 412 (e.g., by recognition of the voice portal identifier, recognition of the account identifier, recognition of the method of request, etc.) Control module 610 may then provide the account identifier and/or the data associated with the voice portal to validation unit 614. Validation unit 614 is configured to establish a connection with a server associated with the voice portal, such as voice portal application server 414 in FIG. 4. Validation unit 614 may be configured to, for example, determine which voice portal application server 414 with which to establish a connection based on the data associated with the voice portal, or this may be automatically configured. Upon establishing the connection, validation unit 614 provides data corresponding to the account identifier to voice portal application server 414. Then, upon confirmation by voice portal application server 414 that the account identifier corresponds to an active subscriber account, validation unit 614 provides an indication of authorization to the control module 610, which then connects voice portal 412 to calling party 120 using audio unit 612.

In addition, upon connecting voice portal 412, audio unit 612 may output a confirmation message to calling party 120. Depending on the limitations, if any, associated with the active subscriber account, calling party 120 may perform selected operations of voice portal 412 using voice input commands. For example, calling party 120 may access an address book, make a call, hear the voice input commands, send a text message or an email, or any combination of these operations.

For clarity of explanation, environment 100 is described herein with reference to the discrete functional elements illustrated in FIGS. 1-6. However, it should be understood that the functionality of these elements and modules may overlap and/or may exist in a fewer or greater number of elements and modules. Elements of environment 100 may, depending on the implementation, lack certain illustrated components and/or contain, or be coupled to, additional or varying components not shown. Moreover, all or part of the functionality of the elements illustrated in FIGS. 1-6 may coexist or be distributed among several geographically dispersed locations.

Figure 7:
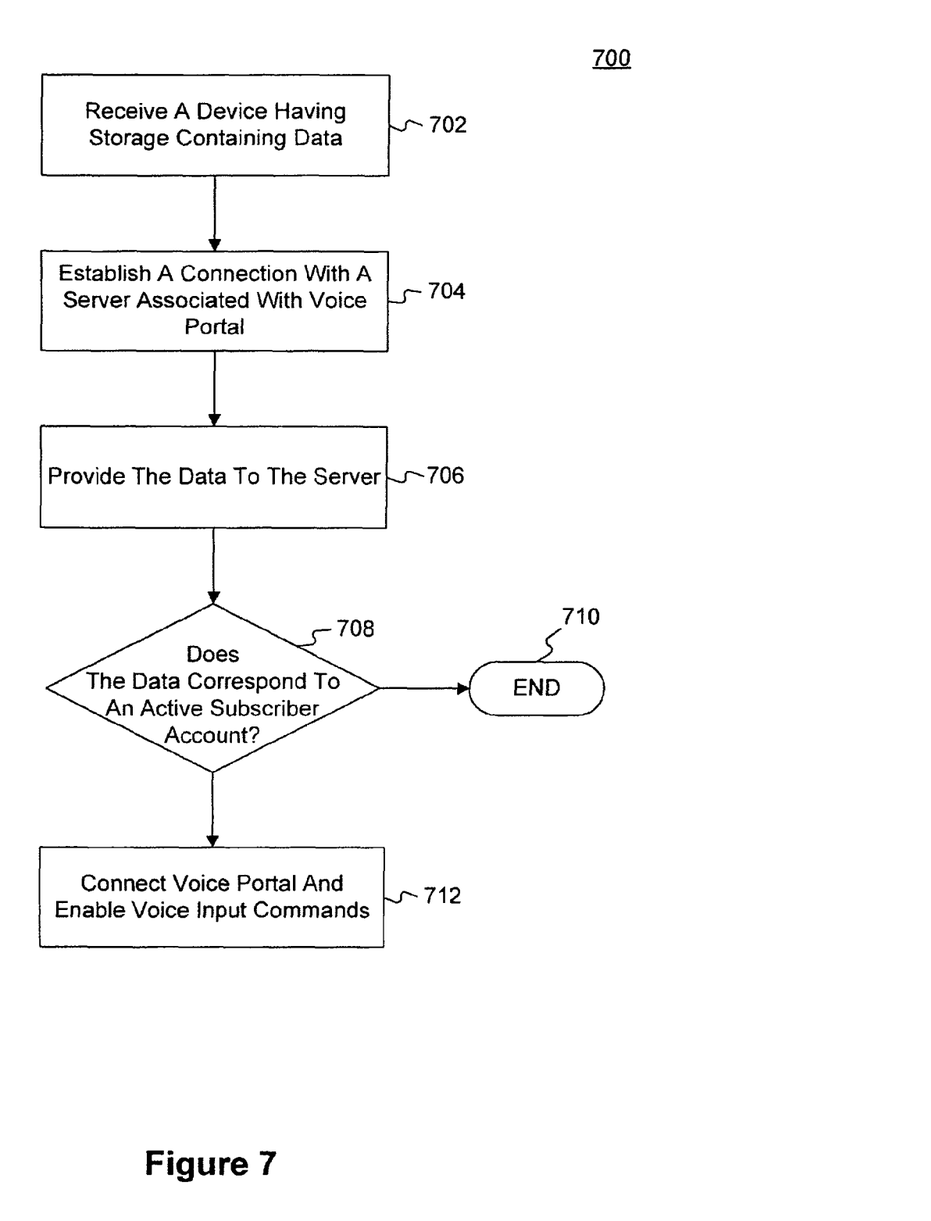
FIG. 7 is a flowchart depicting stages of an exemplary method of enabling a user to perform telecommunication operations.

FIG. 7 is a flowchart depicting stages of an exemplary method 700 of enabling a user to perform telecommunication operations. Method 700 includes receiving a device, such as a credit card, a calling card, or an electronic pass, having a storage containing data associated with voice portal 412 and an account identifier at stage 702. This stage may further include reading a magnetic strip of a credit card or a calling card, communicating with an electronic pass electronically, or reading the device through wireless communication.

At stage 704, a connection with a server associated with voice portal 412, such as voice portal application server 414, is established. This connection may be established based on a voice portal identifier, or may be automatic. Upon establishing the connection, at stage 706, the data associated with voice portal 412 and/or an account identifier may be provided to a server associated with voice portal 412, such as voice portal application server 414.

At stage 708, voice portal application server 414 checks if the account identifier corresponds to an active subscriber account. If the account identifier does not match any active subscriber account, a message may be provided to inform the user that he is not authorized to use voice portal 412 (stage 710). On the other hand, if voice portal application server 414 confirms an active subscriber account, voice portal 412 will be connected to the public access phone 122 and a confirmation message may be provided at stage 712. Therefore, the user may perform selected operations of the voice portal using voice input commands based on limitations, if any, associated with the active subscriber account. For example, a user may access an address book, make a call, hear the voice input commands, send a text message or an email, or any combination of these operations.

The stages illustrated in FIG. 7 are consistent with exemplary implementations of the invention. It is to be understood that the sequence of events described in FIG. 7 are exemplary and not intended to be limiting. Thus, other method steps may be used, and even with the methods depicted in FIG. 7, the particular order of events may vary without departing from the scope of the present invention. Moreover, certain stages may not be present and additional steps may be implemented in the processes illustrated in FIG. 7. For example, the illustrated processes may include additional stages corresponding to verifying the data stored in the device before establishing a connection with voice portal application server 414.

Therefore, embodiments illustrated above provide an easier implementation of connecting a user to a voice portal and automatically authenticating the user. Embodiments consistent with the invention may be implemented in various environments. Further, the processes described herein are not inherently related to any particular apparatus and may be implemented by any suitable combination of components. For example, although FIG. 6 illustrates an exemplary public access phone 122, other apparatuses, such as a user terminal or a video-equipped communication kiosk may also be configured to include a card reader, a validation unit, and an audio unit without departing from the scope of the present invention. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention. It will be evident that various modifications and changes may be made thereunto without departing from the broader scope of the invention as set forth in the claims that follow.

What is claimed is:

1. A method, comprising:
   receiving, by a control module, from a user device having a storage, data associated with an account of a user and data associated with a voice portal;
   establishing, by the control module, a connection with a server associated with the voice portal using the voice portal data, the connection being established automatically upon receipt of the voice portal data;
   upon establishing the connection, providing the user account data to the server;
   receiving, by the control module, confirmation from the server that the user account data corresponds to an active account;
   receiving, by the control module, information identifying one or more operations of the server, the identified operations being associated with at least one limitation of the active account; and
   upon receiving the confirmation, enabling the user to perform the identified operations of the voice portal using voice input commands.

2. The method of claim 1, wherein enabling includes:
   outputting to the user a confirmation message.

3. The method of claim 2, wherein the identified operations include at least one of:
   accessing an address book;
   making a call;
   hearing the voice input commands; or
   sending a text message or an email.

4. The method of claim 1, wherein the user device includes—at least one of a credit card, a calling card, or an electronic pass.

5. The method of claim 1, wherein receiving from the user device includes at least one of:
   reading a magnetic strip of the user device;
   communicating with the user device electronically; or
   reading the user device through wireless communication.

6. The method of claim 1, further comprising:
   providing to the server, by the control module, the voice portal data.

7. The method of claim 6, further comprising:
   determining, by the control module, the server associated with the voice portal based on the voice portal data.

8. A system, comprising:
   a voice portal service coupled to a communications network and configured to provide a subscriber with an ability to perform one or more operations using voice input commands transmitted over the communications network, the one or more operations being associated with at least one limitation of an active subscriber account of the subscriber;
   a voice portal server configured to store subscriber account information related to the voice portal service;
   a receiving unit configured to receive, from a user device having a storage, data corresponding to an account identifier and data associated with a voice portal;
   a validation unit coupled to the receiving unit and configured to:
      establish a connection with the voice portal server using the voice portal data, the connection being established automatically upon receipt of the voice portal data; and
      provide the data corresponding to the account identifier to the voice portal server after establishing the connection; and
   an audio unit coupled to the communication network and configured to:
      receive, from the voice portal server, information identifying the one or more operations; and
      provide audio communications to and from the communications network, in accordance with the received information,
   wherein the voice portal server is further configured to receive the data corresponding to the account identifier, authorize access to the voice portal service when the account identifier corresponds to the active subscriber account, and deny access to the voice portal service when the account identifier does not correspond to the active subscriber account, and
   wherein the validation unit enables access to the voice portal service via the audio unit when the voice portal server has authorized access.

9. The system of claim 8, wherein the audio unit provides a confirmation message when access has been authorized and a denial message when access has been denied.

10. The system of claim 9, wherein the one or more operations include at least one of:
    accessing an address book;
    making a call;
    hearing the voice input commands; or
    sending a text message or an email.

11. The system of claim 8, wherein the device includes at least one of a credit card, a calling card, or an electronic pass.

12. The system of claim 8, wherein the receiving unit includes at least one of:
    a facility to read a magnetic strip of the device;
    a facility to communicate with the device electronically; or
    a facility to read the-device through wireless communication.

13. The system of claim 8, wherein the validation unit is further configured to provide the voice portal data-to the voice portal server.

14. The system of claim 8, wherein the validation unit is further configured to determine the voice portal server based on the voice portal data.

15. An apparatus, comprising:
    a receiving unit configured to receive, from a user device having a storage, data associated with an account of a user and data associated with a voice portal;

a validation unit coupled to the receiving unit and configured to:
  establish a connection with a server associated with the voice portal using the voice portal data, the connection being established automatically upon receipt of the voice portal data;
  provide the user account data to the server after establishing the connection, and
  upon confirmation by the server that the user account data corresponds to an active account, connect the voice portal to the user; and
an audio unit coupled to a communication network and configured to:
  receive, from the voice portal, information identifying one or more operations, the identified operations being associated with at least one limitation of the active account; and
  enable the user to perform the identified operations of the voice portal using voice input commands.

16. The apparatus of claim 15, wherein the audio unit is capable of outputting a confirmation message.

17. The apparatus of claim 16, wherein the identified operations include at least one of:
  accessing an address book;
  making a call;
  hearing the voice input commands; or
  sending a text message or an email.

18. The apparatus of claim 15, wherein the user device includes any one of a credit card, a calling card, or an electronic pass.

19. The apparatus of claim 15, wherein the receiving unit includes a facility configured to do at least one of:
  read a magnetic strip of the user device;
  communicate with the user device electronically; or
  read the user device through wireless communication.

20. The apparatus of claim 15, wherein the validation unit is further configured to provide the voice portal data to the server associated with the voice portal.

21. The apparatus of claim 15, wherein the validation unit is further configured to determine the server associated with the voice portal based on the data associated with the voice portal.

* * * * *